US009440261B2

(12) United States Patent
Ralph

(10) Patent No.: US 9,440,261 B2
(45) Date of Patent: Sep. 13, 2016

(54) SEPARATING SCREENS

(75) Inventor: Andrew Ralph, Longniddry (GB)

(73) Assignee: United Wire Limited, Edinburgh (GB)

( * ) Notice: Subject to any disclaimer, the term of this patent is extended or adjusted under 35 U.S.C. 154(b) by 951 days.

(21) Appl. No.: 12/994,200

(22) PCT Filed: Jul. 8, 2009

(86) PCT No.: PCT/GB2009/050805
§ 371 (c)(1),
(2), (4) Date: Feb. 25, 2011

(87) PCT Pub. No.: WO2010/004328
PCT Pub. Date: Jan. 14, 2010

(65) Prior Publication Data

US 2012/0006735 A1 Jan. 12, 2012

(30) Foreign Application Priority Data

Jul. 10, 2008 (GB) .................................. 0812576.7

(51) Int. Cl.
*B07B 1/46* (2006.01)
*B01D 33/03* (2006.01)
*B01D 35/20* (2006.01)

(52) U.S. Cl.
CPC ........... *B07B 1/4618* (2013.01); *B07B 1/4645* (2013.01); *B07B 2201/02* (2013.01)

(58) Field of Classification Search
CPC .............. B07B 1/4618; B07B 1/4645; B07B 2201/02; B01D 2201/34
USPC ............... 210/232, 499, 498, 450, 384, 388; 209/399, 406
See application file for complete search history.

(56) References Cited

U.S. PATENT DOCUMENTS

| | | | | | |
|---|---|---|---|---|---|
| 2,864,500 | A * | 12/1958 | Miller | | 209/403 |
| 5,522,117 | A * | 6/1996 | Connelly | | 16/375 |
| 7,029,579 | B2 * | 4/2006 | Tapp | | 210/193 |
| 2005/0098481 | A1 | 5/2005 | Reisnet et al. | | |
| 2005/0269267 | A1 * | 12/2005 | Patton et al. | | 210/656 |
| 2006/0219608 | A1 | 10/2006 | Scott et al. | | |
| 2008/0078704 | A1 | 4/2008 | Carr et al. | | |
| 2009/0101558 | A1 * | 4/2009 | Wang | | 210/188 |

FOREIGN PATENT DOCUMENTS

| | | |
|---|---|---|
| WO | 2004035235 | 4/2004 |

* cited by examiner

*Primary Examiner* — Madeline Gonzalez
(74) *Attorney, Agent, or Firm* — Patents+TMS, P.C.

(57) ABSTRACT

A separating screen has a rectangular body (1) one side of which has a seal for sealing against an abutting side of an adjacent screen or shaker basket. The seal is provided by an elongate sealing strip (9) of resilient material held in place on the side of the body by a retaining strip (5) which can be integrally molded with the body (1) or may be a separately formed component.

14 Claims, 3 Drawing Sheets

SEPARATING SCREENS

RELATED APPLICATIONS

This patent application is a U.S. nationalization under 35 USC §371 of international Application No. PCT/GB2009/050805, filed Jul. 8, 2009, which claim priority to Great Britain Patent Application No. 0812576.7, file Jul. 10, 2008. The disclosures set forth in the referenced applications are incorporated herein by reference in their entireties.

FIELD OF THE INVENTION

This invention relates to separating screens the main use for which is to separate components of mixtures, for example to separate or filter solids from mud or slurries generated during oil field drilling.

BACKGROUND TO THE INVENTION

Generally, separating screens are fitted into shaker baskets, with each shaker basket having a plurality of screens. It is therefore necessary to provide a seal where adjacent screens abut and also where screens abut the shaker basket. It is known to co-mould a seal onto the edge of a screen body and also to attach a seal to a screen body by adhesives or by the use of fasteners such as screws. There are disadvantages associated with these known techniques and the invention aims to provide a different way of providing a seal on a screen body.

SUMMARY OF THE INVENTION

According to the invention there is provided a separating screen having a rectangular body one side of which carries a seal for sealing against an abutting side of an adjacent screen or basket, the seal comprising an elongate sealing strip of resilient material held in place against said one side of the body by a retaining strip attached to the body.

The retaining strip preferably clamps the seal to hold it in place.

Preferably, the retaining strip extends for substantially the whole length of the sealing strip so that the complete length of the latter is firmly held against said one side of the screen body, with part of the sealing strip sandwiched between the retaining strip and said one side of the screen body and another part of the sealing strip presenting an exposed surface for sealing against the abutting side of an adjacent screen or the abutting surface of a shaker basket.

The area of the retaining strip engaging the sealing strip may have formations such as pointed protrusions which resiliently engage the sealing strip to improve its retention.

The screen body may carry projections which extend through apertures in the retaining strip, in order to locate the retaining strip with respect to the screen body during manufacture. These projections may have their outer ends melted over areas of the retaining strip so as to serve as melted stakes, sometimes called heat stakes. The projections may alternatively engage the apertures with a snap action, the projections being resiliently deformed as they pass through the apertures and then springing back to hold the retaining strip firmly against the sealing strip. This form of mechanical connection avoids the needs for heated tooling.

The retaining strip may be separately formed from the screen body and attached thereto with the aid of the projections and apertures. Alternatively, the retaining strip may be pre-attached to the body or (as in the preferred embodiment), may be integrally formed with the body. In this case, the retaining strip is preferably attached to the body through an integrally moulded hinge which allows the retaining strip to be rotated (in a folding movement) with respect to the screen body so as to bring the retaining strip into its operative position where it holds the sealing strip against the screen body. The hinge is preferably formed along a lower edge of the body, the exposed surface of the sealing strip then extending along an upper edge of the body.

BRIEF DESCRIPTION OF THE DRAWINGS

The invention will now be described, by way of example, with reference to the accompanying drawings, in which.

DETAILED DESCRIPTION OF THE DRAWINGS

Figure 1:
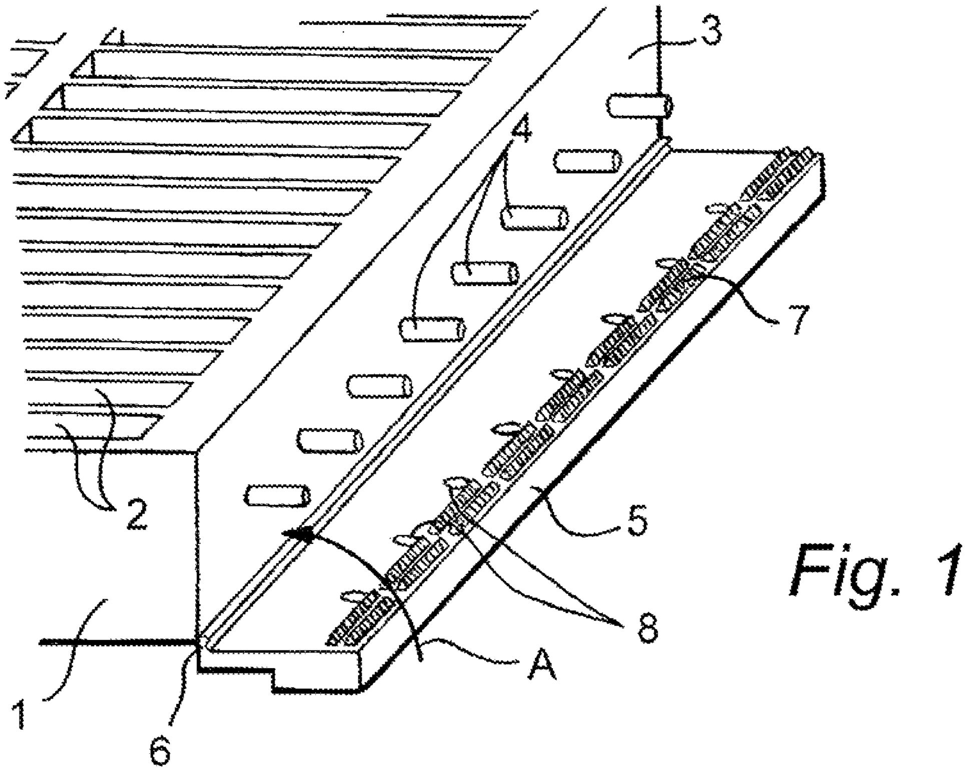
FIG. 1 shows one side of a screen according to the invention, before attachment of a sealing strip to the screen body.

FIG. 1 shows a rectangular screen body 1 of a sifting screen which in use is fitted to a shaker so as to separate solids from liquid drilling muds brought up from down-hole when drilling for oil or gas. Sifting screens generally comprise a frame with a plurality of ribs over which are placed wirecloths which filter solids from liquid drilling mud. The body 1 has slots 2 across which extends the wirecloth (not shown) which performs the separating or filtering function. One side 3 of the body has a series of integrally moulded projections in the form of cylindrical pegs 4. A retaining strip 5 is pre-attached to the body 1, by being integrally moulded with the body 1, and is joined to the body by a hinge 6 extending along the lower edge of the side 3 of the body 1. The retaining strip 5 has the stepped cross-sectional shape shown in FIG. 1. When the strip 5 is in the as-moulded position as illustrated in FIG. 1, the strip 5 extends substantially horizontally from the side 3 of the body and carries on its upper surface a series of formations in the form of pointed protrusions 7 extending in two rows for almost the complete length of the strip 5.

The retaining strip 5 also has a series of apertures or holes 8 which are positioned so that when the strip 5 is rotated about the hinge, i.e folded upwardly towards the body side as shown by arrow A, the pegs 4 register with the holes 8 and are able to penetrate the latter.

Figure 2:
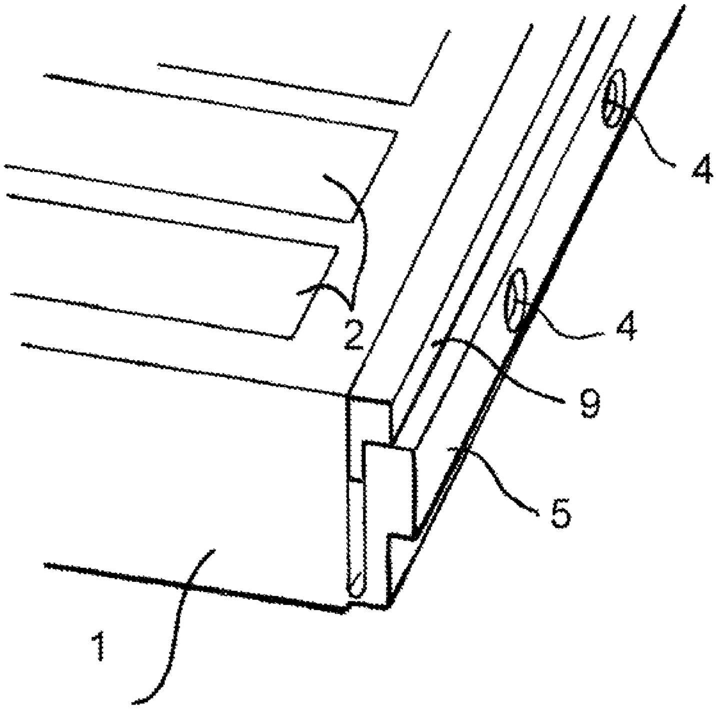
FIG. 2 shows the screen of FIG. 1 after attachment of the sealing strip to the screen body.

The purpose of the retaining strip 5 is to grip a resilient or elastomeric sealing strip 9 (FIG. 2) and hold it against the side 3 of the body 1. The sealing strip 9 is of constant cross-sectional shape (an inverted "L" as indicated in FIG. 2) and has a length corresponding to the length of the body side 3 to which it is to be fitted. The sealing strip 9 is held by the retaining strip 5 by folding the retaining strip 5 towards the pegs 4 which pass through the holes 8, at the same time capturing one limb of the sealing strip 9 so as to sandwich it between the body 1 and the retaining strip 5, and then melting the heads of the pegs 4 by a heating tool so that the pegs 4 form plastic rivets and serve as heat stakes. When the retaining strip 5 is urged against the sealing strip 9, the pointed protrusions 7 locally deform the surface of the resilient strip 9 which is thereby firmly anchored in position with two surfaces of the other limb of the sealing strip 9 presenting an exposed sealing surface for sealing against the abutting side of an adjacent screen or the abutting surface of a shaker basket.

The length of the retaining strip 5 corresponds to the length of the sealing strip 9, and the use of a plurality of spaced heat stakes (formed by the pegs 4) ensures that the sealing strip 9 is firmly clamped along its complete length.

The strip 9 may be made from rubbers, natural rubber, closed cell structure foams, polychloroprene, polypropylene, thermoplastic elastomers (TPE) such as polyurethanes, copolyesters, styrene, copolymers, olefins, elastomeric alloys, polyamides, silicones, nitrile compounds or combinations thereof, or nitrile (NBR) compounds. The materials of the strips 5 and 9 must be resistant to oil-based muds and water-based muds because the main application is in filtering screens for filtering solids from slurries in oil field drilling.

Figure 3:
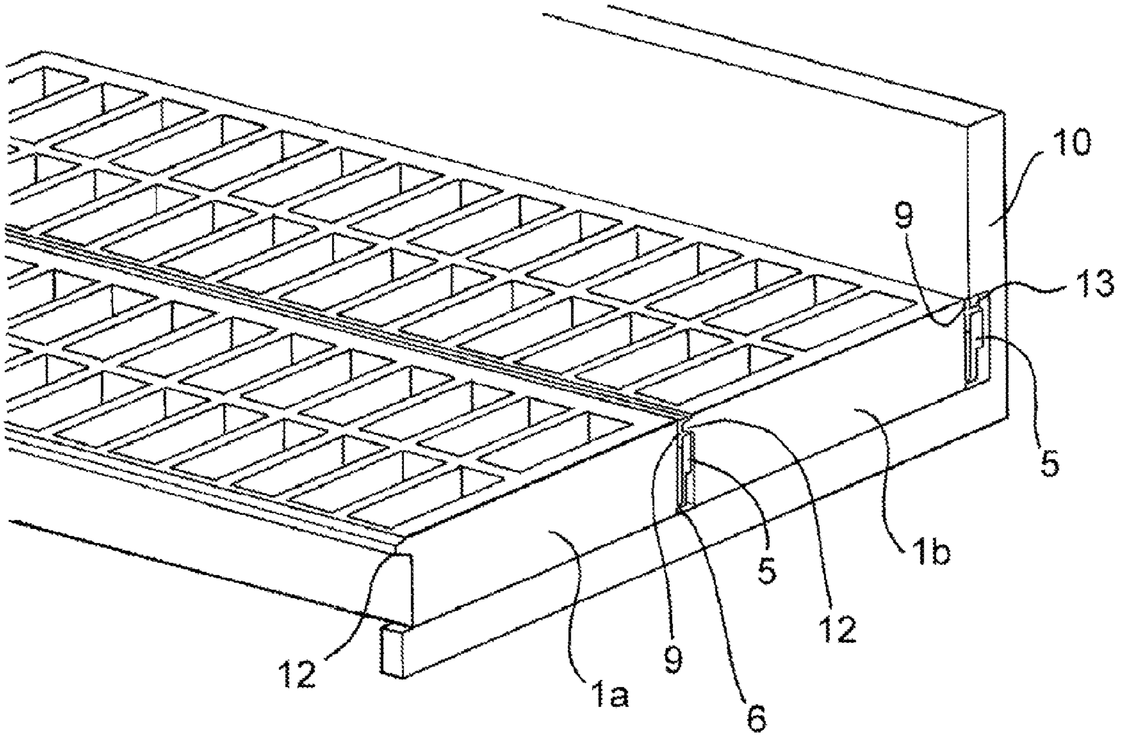
FIG. 3 shows two abutting screens, each in accordance with FIG. 2, fitted in a shaker basket.
Figure 4:
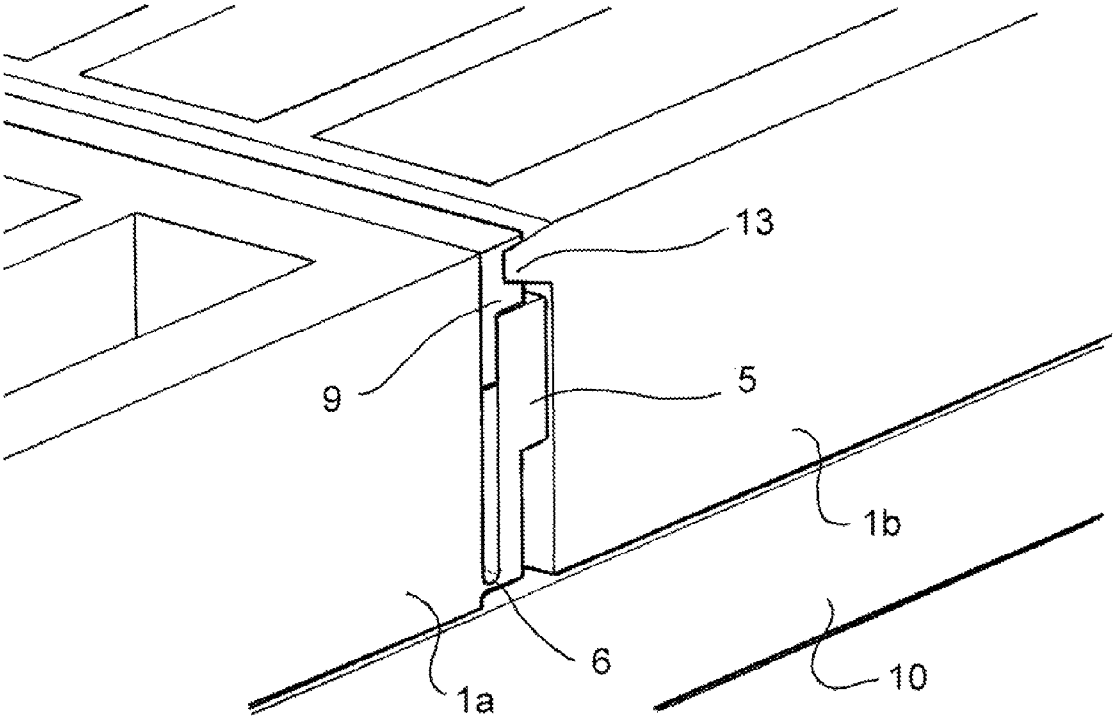
FIG. 4 is an enlarged view of FIG. 3.

FIGS. 3 and 4 show how two screen bodies 1*a* and 1*b*, each fitted with a sealing strip 9 along one side, are located in a shaker basket 10. The side of the body opposite to and parallel with the side carrying the sealing strip 9 has a projecting ledge 12 such that when the two screen bodies 1*a* and 1*b* abut, the ledge 12 of one screen engages and compresses the sealing strip of the abutting screen, thereby providing an effective seal between the screens which prevents the material being filtered from bypassing the wire which spans the major areas of the screens. The shaker basket 10 also has a projecting ledge 13 which engages and seals against the sealing strip 9 of the adjacent screen 1*b*.

Figure 5:
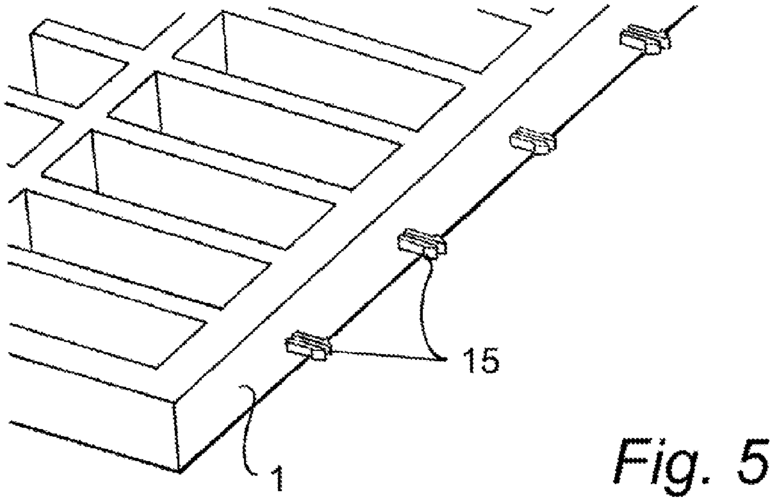
FIG. 5 shows a modified screen body.

The modification of FIG. 5 uses snap pins 15 on the body 1 instead of pegs. The snap pins 15 are split and dimensioned to snap into the holes 8 when the retaining strip 5 is folded against the sealing strip 9. This method of attachment is non-permanent (i.e. the pins could be compressed and the seal replaced) but does not require the use of a heated tool for heat staking.

The sealing strip may be made from a commercially available extrusion the characteristics of which (notably elasticity) can be assessed and finalised in a manner which is simpler and more efficient than co-moulding where the range of available materials is more limited and where expensive tooling is necessary.

The use of an elongated retaining strip spreads and distributes the clamping pressure along the complete length of the sealing strip, in contrast to the use of screws which apply localised clamping pressure to discrete areas. Further, moulding the pegs with the body avoids a possible adverse reaction to the presence of water or oil-based muds, which can occur with metal screws or adhesive.

The invention claimed is:

1. A separating screen having a rectangular body with a top surface and a side surface wherein the top surface is substantially perpendicular to the side surface wherein the side surface of the rectangular body has projections which extend horizontally from the rectangular body with respect to the top surface, the separating screen comprising:

a retaining strip that has apertures wherein the retaining strip is attached to the rectangular body through an integrally molded hinge wherein the projections extend through the apertures in the retaining strip and align the retaining strip with respect to the rectangular body; and a seal for sealing against an abutting side of an adjacent screen or basket wherein the seal has an elongate sealing strip of resilient material that has a cross section that is generally L-shaped and has a first limb that is connected to the side surface by the retaining strip wherein the retaining strip has a plurality of protrusions that contact the first limb of the elongate sealing strip and deform the elongate sealing strip to improve retention of the elongate sealing strip.

2. The separating screen of claim 1, wherein the retaining strip clamps the seal to hold the seal in place.

3. The separating screen of claim 1, wherein the retaining strip has a length that is substantially equal to a length of the elongate sealing strip so that the length of the elongate sealing strip is held against the side surface of the rectangular body wherein the first limb of the elongate sealing strip is sandwiched between the retaining strip and the side surface of the rectangular body and further wherein a second limb of the sealing strip presents an exposed surface for sealing against the abutting side of the adjacent screen or basket.

4. The separating screen of claim 1, wherein the projections have outer ends melted over areas of the retaining strip to form melted stakes.

5. The separating screen of claim 1, wherein the projections engage the apertures with a snap action wherein the projections are resiliently deformed as the projections pass through the apertures and then spring back to hold the retaining strip firmly against the sealing strip.

6. The separating screen of claim 1, wherein the plurality of protrusions contact the first limb of the elongate sealing strip and compress the elongate sealing strip to retain the elongate sealing strip.

7. The separating screen of claim 1, wherein the projections have two portions with a gap located between the two portions.

8. The separating screen of claim 7 wherein the projections move toward the gap when extended into the apertures.

9. A separating screen having a rectangular body, the separating screen comprising:

a seal for sealing against an abutting side of an adjacent screen or basket, wherein the seal has an elongate sealing strip of resilient material having a cross section that is generally L-shaped and formed by a first limb and a second limb wherein the elongate sealing strip has a length that is substantially equal to a length of a side of the rectangular body and further wherein the second limb has two surfaces that are flat and that seal to the abutting side of the adjacent screen or basket; and a retaining strip attached to the body through an integrally molded hinge wherein the integrally molded hinge allows the retaining strip to be rotated in a folding movement with respect to the rectangular body of the screen so as to bring the retaining strip into an operative position wherein the retaining strip contacts the first limb and holds the elongate sealing strip against the side of the rectangular body of the screen wherein the retaining strip has a plurality of protrusions that contact the first limb of the elongate sealing strip and deform the elongate sealing strip to improve retention of the elongate sealing strip.

10. The separating screen of claim 9, wherein the plurality of protrusions contact the first limb of the elongate sealing strip and compress the elongate sealing strip to retain the elongate sealing strip.

11. The separating screen of claim 9, wherein the retaining strip clamps the seal to hold the seal in place.

12. The separating screen of claim 9, further comprising:

projections which extend horizontally from the rectangular body; and apertures in the retaining strip wherein the projections extend through the apertures in the retaining strip and align the retaining strip with respect to the rectangular body.

13. The separating screen of claim 12, wherein the projections have outer ends melted over areas of the retaining strip to form melted stakes.

14. The separating screen of claim 12, wherein the projections are deformed as the projections extend through the apertures and spring back to hold the retaining strip against the sealing strip.

* * * * *